United States Patent
Leyrer et al.

[11] Patent Number: 5,928,981
[45] Date of Patent: Jul. 27, 1999

[54] DIESEL CATALYTIC CONVERTER

[75] Inventors: Jürgen Leyrer, Kahl; Dieter Lindner, Hauau; Egbert Lox, Hanau; Thomas Kreuzer, Karben; Wilfried Müller, Offenbach; Rainer Domesle, Alzenau, all of Germany

[73] Assignee: Degussa-Hüls Aktiengesellschaft, Frankfurt am Main, Germany

[21] Appl. No.: 08/838,846

[22] Filed: Apr. 11, 1997

[30] Foreign Application Priority Data

Apr. 12, 1996 [DE] Germany ............... 196 14 540

[51] Int. Cl.$^6$ ............... B01J 29/06; B01J 29/22; B01J 8/00

[52] U.S. Cl. ............... 502/64; 422/171; 422/177; 422/211; 423/212; 423/213.5; 423/239.2; 502/66; 502/67

[58] Field of Search ............... 422/177, 171, 422/211, 180, 222; 60/299; 502/439, 300, 309, 349, 240, 258, 261, 325, 66, 67, 64, 414, 415; 423/212, 213.2, 213.5, 213.7, 239.2

[56] References Cited

U.S. PATENT DOCUMENTS

| | | | |
|---|---|---|---|
| 4,983,366 | 1/1991 | Deller et al. | 423/245.1 |
| 5,085,762 | 2/1992 | Absil et al. | 208/120 |
| 5,089,459 | 2/1992 | Sato et al. | 502/66 |
| 5,118,889 | 6/1992 | Muthusamy | 570/219 |

FOREIGN PATENT DOCUMENTS

| | | |
|---|---|---|
| 432534 | 6/1991 | European Pat. Off. . |
| 0559021A2 | 9/1993 | European Pat. Off. . |
| 0582971 | 2/1994 | European Pat. Off. . |
| 0706817A2 | 4/1996 | European Pat. Off. . |
| 0716877A1 | 6/1996 | European Pat. Off. . |
| 4239875A1 | 6/1994 | Germany . |
| 4435073 | 4/1995 | Germany . |

*Primary Examiner*—Hien Tran
*Attorney, Agent, or Firm*—Smith, Gambrell & Russell, LLP; Beveridge, DeGrandi, Weilacher & Young Intellectual Property Group

[57] ABSTRACT

A catalyst for purifying the exhaust gases from diesel engines. The catalyst contains a zeolite mixture of several zeolites with different moduli and platinum group metals as well as further metal oxides from the group aluminum silicate, aluminum oxide and titanium oxide, wherein the aluminum silicate has a ratio by weight of silicon dioxide to aluminum oxide of 0.005 to 1 and the platinum group metals are deposited on only the further metal oxides.

16 Claims, No Drawings

DIESEL CATALYTIC CONVERTER

INTRODUCTION AND BACKGROUND

The present invention relates to a catalyst for purifying the exhaust gases from diesel engines which contain one or more zeolites and at least one platinum group metal. In a further aspect, the present invention relates to a method of using the catalysts as described herein for the purification of diesel engine exhaust.

The exhaust gases from diesel engines contain carbon monoxide, unburnt hydrocarbons, nitrogen oxides and particles of soot as air pollutants. The unburnt hydrocarbons include paraffins, olefins, aldehydes and aromatic compounds. In comparison to the exhaust gases from gasoline engines, diesel exhaust gases contain a substantially higher proportion of long-chain paraffins which are difficult to oxidize. In addition, diesel exhaust gases are substantially colder than the exhaust gases from gasoline engines and contain oxygen at a concentration between 3 and 10 volume percent.

The high oxygen concentration relates to the fact that diesel engines are operated with a large air/fuel ratio (kilograms of air to kilograms of fuel) of more than 18. Gasoline engines, in contrast, operate with an air/fuel ratio of 14.6, which enables stoichiometric combustion of hydrocarbons. The exhaust gases from gasoline engines therefore contain virtually no oxygen.

When operated under part-load, the exhaust gas temperature in a diesel engine is in the range 100 to 250° C. and achieves a maximum temperature of 500 to 650° C. only when operated under full load. In contrast, the exhaust gas temperature in a gasoline engine is between 400 and 450° C. under part-load and can rise to 1000° C. under full load.

The particles of soot in diesel exhaust gases consist of hydrocarbon cores with volatile organic components (VOC =volatile organic compounds) adsorbed thereon as well as adsorbed sulphates which are produced during combustion in a diesel engine as a result of the sulphur content of diesel fuel.

Due to the special properties of diesel exhaust gases, tailor-made exhaust gas purification systems have been developed for purifying them.

DE 39 40 758 A1 describes a catalyst for the oxidative purification of exhaust gases from diesel engines with high conversion rates for hydrocarbons and carbon monoxides at low temperatures and an inhibited oxidizing effect toward nitrogen oxides and sulphur dioxide. The active component in the catalyst consists of platinum, palladium, rhodium and/or iridium placed in contact with vanadium or an oxidic vanadium compound. The active component is deposited into finely divided aluminum oxide, titanium oxide, silicon oxide, zeolite or mixtures of these. The catalyst is applied in the form of a coating onto channels which allow the free passage of gases in a honeycomb shaped support made of ceramic or metal. The light-off temperatures $T_{50\%}$ of this catalyst for carbon monoxide and hydrocarbons are in the range of 210 to 275° C. (The light-off temperatures $T_{50\%}$ are the temperatures of the exhaust gas at which just 50% of the pollutants are converted into harmless components.) At 350° C. the catalyst exhibits good conversion rates for carbon monoxide and hydrocarbons. The catalyst allows nitrogen oxides to pass through virtually unchanged. Sulphur dioxide is oxidized to sulphur trioxide to only a very small extent. As a result of the diminished oxidizing effect toward sulphur dioxide, this catalyst also leads to lower particle emissions than other oxidizing catalysts since less sulphate is available for adsorption onto the soot cores in the exhaust gases.

The problem of particle emission is being reduced by the planned introduction of low-sulphur diesel fuels, so the catalyst in DE 39 40 758 A1 will become less important.

EP 0 427 970 A2 describes a catalyst for reducing the amount of nitrogen oxides in an oxidizing exhaust gas with an air/fuel ratio of 22. The catalyst contains at least one zeolite with a molar ratio $SiO_2/Al_2O_3$ of more than 10 and pore diameters of 0.5 to 1 nm. Platinum groups metals are deposited on the zeolites, wherein, for each platinum group metal, a minimum ratio by weight of metal to zeolite should not be undershot if good conversion rates for nitrogen oxides are still to be obtained even after aging of the catalyst.

DE 44 35 073 A1 describes a catalyst which contains a mixture of at least two zeolites with different pore diameters and also cerium oxide loaded with palladium. The mixture of zeolites is used to adsorb the differently sized hydrocarbon molecules in the exhaust gas during the cold-start phase. Palladium and cerium oxide are used to convert the adsorbed hydrocarbons into harmless constituents.

An object of the present invention is to provided an improved catalyst, as compared with the prior art, for purifying the exhaust gases from diesel engines, which is capable of oxidizing in particular long-chain paraffins which are difficult to oxidize in the exhaust gas at temperatures below 200° C., and simultaneously of reducing nitrogen oxides, despite the high oxygen content of the diesel exhaust gas.

SUMMARY OF THE INVENTION

The above and other objects of the invention are achieved by a catalyst and method for purifying the exhaust gases from diesel engines wherein the catalyst comprises one or more zeolites and at least one platinum group metal. The catalyst is characterized in that it also contains one or more additional metal oxides selected from the group consisting of aluminum silicate, aluminum oxide and titanium oxide, wherein the aluminum silicate has a ratio by weight of silicon dioxide to aluminum dioxide of 0.005 to 1. In the catalyst of the invention the platinum group metal is deposited on only these additional metal oxides.

DETAILED DESCRIPTION OF THE INVENTION

According to the invention, the catalyst contains, in addition to zeolites, other metal oxides which act as a support for the platinum groups metals. It is essential for purposes of this invention that the platinum group metals are deposited only on these additional metal oxides and not on the zeolites. Deposition of the platinum group metals on the zeolites leads to less active catalysts (see comparison Example C1).

Deposition of the platinum group metals on the additional metal oxides (also called activating the metal oxides in the following) may be performed in a variety of ways. It is important that the method of deposition selected ensures production of the most uniformly and finely distributed deposit of platinum group metals possible on the additional metal oxides.

One possible method of deposition is to impregnate the additional metal oxides, before mincing with the zeolites, with a solution of soluble precursors of the platinum group metals. Aqueous solutions are preferably used for this purpose.

Suitable precursors of platinum group metals are any common salts and complex salts of the same. Examples of such compounds are hexachloroplatinic acid, tetrachloroplatinic acid, diammine-dinitroplatinum(II), tetraammineplatinum(II) chloride, ammonium tetrachloroplatinate(II), ammonium hexachloroplatinate (IV), platinum ethylenediamine dichloride, tetraammineplatinum(II) nitrate, tetraammineplatinum(II) hydroxide, methylethanolamine platinum(II) hydroxide, platinum nitrate, palladium chloride, palladium nitrate, diamminedinitropalladium(II), tetraammine-palladium(II) hydroxide and hexachloroiridium acid.

To impregnate the additional metal oxides, these are placed in contact with an aqueous solution of the platinum group metal(s), with constant stirring, so that a moist powder is produced. The volume of solvent is selected to correspond to about 100 to 130, preferably 110% of the water absorption capacity of the metal oxide powder being impregnated. After drying for about 1 to 3 hours at an elevated temperature of 80 to 140° C., the powder produced is calcined in air at 200 to 500, preferably 300° C. for 1 to 4 hours and then reduced in a hydrogen-containing stream of gas, preferably forming gas comprising 95 vol. % of nitrogen and 5 vol. % of hydrogen. Here, temperatures in the range of 300 to 600° C., preferably 500°, are used. Reduction is complete after about 1 to 3 hours. Investigations using an electron microscope show that the platinum group metals deposited on the specific surface area of the metal oxides are finely distributed with crystallite sizes between 10 and 50 nm.

Using this procedure, the additional metal oxides can be coated with a concentration of 0.01 to 5 wt. % of platinum group metal, with reference to the total weight of impregnated metal oxides. With the objective of suppressing the oxidation of sulphur dioxide to sulphur trioxide, the additional metal oxides may be coated with vanadium at the same time as with the platinum group metals or in any sequence with these. In addition, further base metals such as nickel and copper may be deposited onto the additional metal oxides in order to have an effect on the catalytic activity of the platinum group metals. Soluble precursors of these metals are used for this purpose.

The additional metal oxides act as carrier material for the catalytically active platinum group metals. Particularly suitable metal oxides, therefore, are those which have a high specific surface area of more than 10 m$^2$/g. In the case of aluminum oxide, these are so-called active aluminum oxides. These have the crystal structures of the transition series of crystallo-graphic phases of aluminum oxide which are passed through when aluminum oxide/hydroxide such as, for example, gibbsite or boehmite, are calcined at up to more than 1000° C. In detail these are chi, eta, gamma, kappa, delta and theta-aluminum oxide. Their specific surface areas may be several hundred square meters per gram. These materials may be doped with, for example, rare earth oxides, in order to stabilize their specific surface areas.

Materials which are suitable for use as titanium oxide are those which have been produced in a wet-chemical process (sulphate or chloride process) or by flame hydrolysis of titanium tetrachloride. Titanium oxides produced in a wet-chemical process largely possess the crystal structure of anatase and have specific surface areas of usually more than 50 m$^2$/g. Titanium oxides produced by flame hydrolysis have a mixed structure of about 70% anatase and 30% rutile. The specific surface area of these so-called pyrogenic titanium oxides is about 50 m$^2$/g.

From among the additional metal oxides, aluminum silicate is preferably used as support material for the platinum group metals. In this case the material is a special aluminum silicate which has a ratio by weight of silicon dioxide to aluminum oxide of 0.005 to 1 and a very homogeneous distribution of aluminum oxide and silicon dioxide. The crystal structure of this aluminum silicate, in contrast to the zeolite, is boehmitic and becomes amorphous with increasing amounts of silicon dioxide. The specific surface area of this aluminum silicate, depending on the concentration of silicon dioxide, is 200 to 500 m$^2$/g and exhibits exceptional surface area stability under the operating conditions obtained during purification of diesel exhaust gases. Table 1 shows these properties. The upper half of this gives the specific surface are (BET surface area according to Brunauer, Emmett and Teller in accordance with DIN 66131) for different compositions of the aluminum silicate in the freshly prepared state and after forced aging (storage for 7 hours at 900° C. in a synthetic exhaust gas comprising 10 vol. % carbon monoxide, 6 vol. % oxygen, 10 vol. % water vapor, remainder nitrogen).

By means of the previously described impregnation of aluminum silicate with platinum group metals, a specific concentration of metal crystallites is obtained per square meter of specific surface area of aluminum silicate for a given loading of the aluminum silicate (for example, 1.5 wt. % of Pt with reference to the total weight of aluminum silicate and platinum). The crystallite concentration can be increased for the same loading by decreasing the specific surface area of the aluminum silicate.

It has been shown that the light-off temperature of the catalyst for the conversion of carbon monoxide is affected in a positive manner by increasing the crystallite concentration.

In order to reduce the specific surface area of the aluminum silicate while maintaining the same composition, it may be subjected to calcination of 1000° C. for different periods of time. In the lower half of Table 1, three materials which have been treated in this way are described. Aluminum silicates of a given composition but with different specific surface areas can thus be prepared by calcination. For the purposes of the present invention, materials with a specific surface area greater than 100 m$^2$/g are preferably used.

As a measure of the crystallite concentration on the specific surface area of the aluminum silicate, the platinum concentration in mg of Pt per square meter of specific surface are (in the freshly prepared state) is given in the last column of Table 1, calculated for the case of loading the aluminum silicate with 1 wt. % of platinum. It can be seen that, for a given composition of aluminum silicate (e.g., 95 Al$_2$O$_3$/5 SiO$_2$) and a given platinum loading (e.g., 1 wt. %), the platinum concentration on the specific surface area, and thus the crystallite concentration, can be affected by varying the specific surface area.

An aluminum silicate with a ratio by weight of silicon dioxide to aluminum oxide of less than 0.5, in particular less than 0.25, is preferably used for the catalyst according to the invention.

TABLE 1

Surface Stability of Aluminum Silicate

| Al$_2$O$_3$-Content [wt. %] | SiO$_2$-Content [wt. %] | Ratio by Weight SiO$_2$/Al$_2$O$_3$ | Specific Surface Area [m$^2$/g] fresh | aged | $\frac{\text{mg Pt}}{\text{m}^2}$ |
|---|---|---|---|---|---|
| 98.5 | 1.5 | 0.015 | 200 | 159 | 0.05 |
| 95 | 5 | 0.053 | 286 | 235 | 0.035 |
| 90 | 10 | 0.111 | 333 | 224 | 0.03 |

TABLE 1-continued

Surface Stability of Aluminum Silicate

| $Al_2O_3$-Content [wt. %] | $SiO_2$-Content [wt. %] | Ratio by Weight $SiO_2/Al_2O_3$ | Specific Surface Area [m²/g] fresh | aged | $\dfrac{mg\ Pt}{m^2}$ |
|---|---|---|---|---|---|
| 80 | 20 | 0.250 | 374 | 265 | 0.027 |
| 70 | 30 | 0.429 | 407 | 270 | 0.025 |
| 60 | 40 | 0.667 | 432 | 271 | 0.023 |
| 95 | 5 | 0.053 | 212 | 175 | 0.047 |
| 95 | 5 | 0.053 | 153 | 137 | 0.065 |
| 95 | 10 | 0.111 | 163 | 138 | 0.061 |

These aluminum silicates may optionally contain homogeneously incorporated elements which form oxides stable at high temperatures. Suitable elements are, for example, the rare earths such as lanthanum and cerium as well as zirconium and the alkaline earth metals, which are incorporated in the form of appropriate precursors. Concentrations of up to 10 wt. %, calculated as the oxide of these elements are preferred. High concentrations of alkali metals such as, for example, sodium have proven to be unsuitable. Particularly suitable aluminum silicates have a concentration of sodium, calculated as the oxide, of preferably less than 75 ppm.

The homogeneous distribution of aluminum oxide and silicon dioxide which is required cannot be obtained by conventional processes for stabilizing aluminum oxide. Physical mixtures of aluminum oxide and silicon dioxide, too, are not suitable for catalysts according to the invention.

A particularly suitable aluminum silicate is described in DE 38 39 580 C1. In accordance with this patent, the aluminum silicate is obtained by mixing an aluminum compound with a silicic acid compound in aqueous medium, drying and optionally calcining the product. The aluminum compound used is a $C_2$–$C_{20}$-aluminum alcoholate which is hydrolyzed with water purified by passage through an ion exchanger. 0.1 to 5.0 wt. % of orthosilicic acid, purified by passage through an ion exchanger, are added to the hydrolysis water. As an alternative, 0.1 to 5.0 wt. % of orthosilicic acid, purified by passage through an ion exchanger, are added to the alumina/water mixture obtained by neutral hydrolysis. This particularly preferred aluminum silicate may contain lanthanum oxide or also other rare earth oxides.

The zeolites used in the catalyst according to the invention must have a modulus greater than 10 in order to be sufficiently stable toward the acid components in the exhaust gas and to the maximum exhaust gas temperature. Suitable zeolites are, for example, ZSM5, mordenite and dealuminized Y-zeolite (DAY). They may be used in the $Na^+$ or $H_+$ form.

Zeolites can be described by the general formula:

$$M_{2/n}\ O.Al_2O_3.x\ SiO_2.y\ H_2O$$

where $x \geq 2$ (Donald W. Breck: "Zeolite Molecular Sieves," John Wiley & Sons, 1974). Here, M represents a cation with a valency of n such as, for example, $H^+(n=1)$, $Na^+(n=1)$ or $Ca^{2+}(n=2)$. x is the so-called modulus of the zeolite and which is the molar ratio of silicon dioxide to aluminum oxide. Taking into account the molar weights, zeolites therefore have a ratio by weight of silicon dioxide to aluminum oxide of more than 1.18. Zeolites with a modulus of greater than 10, i.e., with a ratio by weight of silicon dioxide to aluminum oxide of greater than 5.9 are preferably used for the catalyst according to the invention. A ratio of this size ensures adequate stability of the characteristic crystal structure of the zeolites at the temperatures in diesel exhaust gases and at the concentrations of acid pollutants contained in them.

In a particularly advantageous variant of the invention, a zeolite mixture of at least two zeolites is used, one having a modulus of less than 50 and the other a modulus of more than 200. It has been shown that the broadest possible spectrum of modules for the zeolites used has an advantageous effect on the conversion rates of the pollutants. By means of a dealuminizing treatment, it is possible to prepare zeolites of one structural type with a broad spectrum of modules. The modulus of a ZSM5 zeolite with a stoichiometric composition, for example, has a value of 5. By means of dealuminization, the modulus values can be adjusted to more than 1000. Similar behavior is shown by Y-zeolites and mordenite. Table 2 lists the properties of some zeolites which are suitable for the catalyst according to the invention.

TABLE 2

Properties of Some Zeolites

| Zeolite | Modulus | Spec. Surface Area [m²/g] | Pore Diameter [nm] | Pore volume [ml/g] |
|---|---|---|---|---|
| H-mordenite | 20 | 565 | 0.4–0.5/0.8–0.9* | 1.76 |
| H-ZSM5 | 40 | 360 | 0.5–0.6 | 2.09 |
| H-ZSM5 | 120 | 415 | 0.5–0.6 | 0.6 |
| DAY | 200 | 755 | 0.74 | 1.03 |
| Na-ZSM5 | >1000 | 770 | 0.5–0.6 | 1.61 |

*bimodal pores

A mixture of the 5 zeolites cited in Table 2 is preferably used in the catalyst according to the invention. The ratio by weight of the zeolites with respect to each other can be varied over wide limits. However, a mixture with equal parts by weight of all the zeolites is mainly used.

In a further advantageous version of the invention, a platinum activated aluminum silicate is combined with a zeolite mixture of a dealuminized Y-zeolite and a Na-ZSM5 zeolite whose moduli are greater than 120. The two zeolites DAY and Na-ZSM from Table 2 with moduli of 200 and >1000, respectively, are preferably used. A particularly low light-off temperature for the conversion of carbon monoxide is obtained if an aluminum silicate with a specific surface area between 100 and 200 m²/g and with a platinum loading between 0.05 and 0.2 mg Pt/m² is used. Particularly suitable for this purpose is an aluminum silicate with a $SiO_2$ content of about 5 wt. % and a specific surface area between 140 and 170 m²/g. The low light-off temperature under part-load is in the range 100 to 150° C. In this temperature range, a small reduction in the light-ff temperature represents a clear improvement in pollutant conversion.

To prepare the catalyst according to the invention, the zeolite mixture is mixed with the catalytically activated additional metal oxides. In this case, ratios by weight of metal oxides to zeolite mixture of 10:1 to 1:3, preferably 6:1 to 2:1, are used.

The zeolite mixture in the catalyst has the main task of storing the hydrocarbons in the exhaust gas at low exhaust gas temperatures (<150–200° C.) in order to release them again under operating conditions for the diesel engine with higher exhaust gas temperatures. At these higher exhaust gas temperatures, the desorbed hydrocarbons are partially oxidized by the catalytically activated additional metal oxides to give carbon monoxide and water. The non-oxidized fraction of the hydrocarbons acts, in addition to carbon monoxide, as a reducing agent for the catalytic reduction of nitrogen oxides contained in the exhaust gas.

The optimum ratio by weight of additional metal oxides to zeolite mixture depends on the average concentration of hydrocarbons in the exhaust gas and thus also depends on the type of diesel engine. At a ratio by weight of more than 10:1, however, adequate storage of the hydrocarbons can no longer be guaranteed. If, in contrast, the ratio by weight of metal oxides to zeolite mixture is less than 1:3, the catalytic activity of the catalyst is no longer adequate. For direct injection and indirect injection diesel engines, ratios by weight b=o between 6:1 and 2:1 have proved useful.

The resulting catalyst mixture can be processed by adding appropriate auxiliary agents such as inorganic binders (e.g., silica sol), pore producers, plasticizers and moistening agents in a known way to give molded items such as tablets and extrudates. Preferably, however, the catalyst is applied in the form of a coating to the internal walls of the flow channels in the honeycomb carriers.

For exhaust gas purification of diesel engines, amounts of coating of 50 to 400 g/l of honeycomb carrier volume are required. The composition of the catalyst should be adjusted so that the catalytically active components on the additional metal oxides are present at a concentration of 0.01 to 5 g/l of honeycomb carrier volume.

The coating procedures required are known to a person skilled in the art. Thus, for example, the catalyst mixture of activated metal oxides and zeolite mixture are processed to give nan aqueous coating dispersion. Silica sol, for example, may be added to this dispersion as a binder. The viscosity of the dispersion may be adjusted by suitable additives so that it is possible to apply the required amount of coating to the walls of the flow channels in a single working process. If this is not possible, the coating procedure may be repeated several times, wherein each freshly applied coating is fixed by an intermediate drying process. The final coating is then dried at elevated temperature and calcined in air for a period of 1 to 4 hours at temperatures between 300 and 600° C.

The invention is now explained in more detail using a few examples and some comparison examples from the prior art.

Comparison Example C1

A comparison catalyst was prepared in accordance with EP 0 427 970 A2. For this, a coating dispersion with a solids concentration of 30 wt. % was made up. The dispersion contained 80 wt. %, with reference to dry substance, of zeolite powder (H- mordenite, x=25 and 20 wt. % of silica sol). A honeycomb carrier was then coated with the oxides by immersion in the coating dispersion and afterwards dried at 100° C. in air. After being maintained at 300° C. for 1.5 hours, the coated honeycomb carrier was calcined for 3 hours at 500° C. The coating honeycomb carrier was then impregnated with an aqueous solution of tetra-amminе-platinum(II) hydroxide dried at 150° C. in air and calcined at 250° C. The final catalyst contained 120 g of oxide and 1.77 g of platinum per liter of honeycomb carrier volume.

The open-celled honeycomb carrier consisted of cordierite with a diameter of 2.5 cm, a length of 7.6 cm and 62 cells or flow channels per $cm^2$, the flow channels having a wall thickness of 0.2 mm.

Comparison Example C2

A comparison catalyst was prepared as follows, in accordance with DE 39 40 758 A1, Example 18. An aqueous coating dispersion with a solids content of 40% was made up. The dispersion contained, with reference to dry substance, 60 wt. % of γ-aluminum oxide (180 $m^2$/g specific surface area) and 40 wt. % of titanium dioxide (50 $m^2$/g specific surface area). Then a honeycomb carrier was coated with the metal oxides by immersion in the coating dispersion and afterwards dried at 120° C. in the air. After calcining for 2 hours at 400° C., the coated honeycomb carrier was impregnated with an aqueous solution of tetraamineplatinum(II) hydroxide dried at 150° C. in air and calcined at 300° C. Afterwards, impregnation with vanadium oxalate was performed. Drying was performed at 120° C. in air, vanadium decomposition at 500° .C in air. The catalyst precursor obtained in this way was reduced for a period of 2 hours at 500° C. in a stream of forming gas (95% $N_2$, 5% $H_2$) . The final catalyst contained, per liter of honeycomb carrier volume, 64 g of titanium dioxide, 96 g of aluminum oxide, 5 g of vanadium oxide and 1.77 g of platinum.

Comparison Example C3

A comparison catalyst was prepared as follows, in accordance with DE 39 40 758 A1. An aqueous coating dispersion with a solids content of 40% was made up. The dispersion contained, with reference to dry substance, 95 wt. % of γ-aluminum oxide (180 $m^2$/g specific surface area) and 5 wt. % of silicon dioxide (100 $m^2$/g specific surface area). Then a honeycomb carrier was coated with the metal oxides by immersion in the coating dispersion and afterwards dried at 120° C. in air. After calcining for 2 hours at 400° C., the coated honeycomb carrier was impregnated with an aqueous solution of hexachloroplatinic acid, dried at 150° C. in air and calcined at 300° C. The catalyst precursor obtained in this way was reduced for 2 hours at 500° C. in a stream of forming gas (98% $N_2$, 5% $H_2$). The final catalyst contained, per liter of honeycomb carrier, 200 g of oxide and 1.77 g of platinum.

Comparison Example C4

A comparison catalyst was prepared as follows, in accordance with DE 44 35 073 A1, Example 13. First, cerium dioxide with a specific surface area of 105 $m^2$/g was impregnated with palladium. For this, the cerium dioxide was placed in contact with an aqueous solution of tetraammine-platinum(II) nitrate, with constant stirring, so that a moist powder was produced. After drying for two hours at 120° C. in air, the powder produced was calcined for 2 h at 300° C. in air. The Pd-cerium oxide powder contained, with reference to the total weight, 1.47 wt. % of palladium. An aqueous coating dispersion with a 40% solids content was made up from the prepared Pd/$CeO_2$ powder. To this were added the following zeolite powders in the ratio 1:1:1:1:1: DAY (x=200); Na-ZSM5 (x>1000); H-ZSM5 (x=120); H-ZSM5 (x=40); H-mordenite (x=20). Then a honeycomb carrier was coated with an amount of 180 g of oxides per liter of honeycomb carrier volume, by immersion in the coating dispersion. The coating was dried in air at 120° C. and then calcined for 2 h at 500° C. The final catalyst contained, per liter, of catalyst volume, 1.77 g of palladium.

Example E1

An aluminum silicate with 5 wt. % of silicon dioxide (spec. surface area 286 $m^2$/g; see Table 1) was activated with platinum for the catalyst according to the invention. For this, the aluminum silicate was placed in contact with an aqueous solution of tetraammineplatinum(II) hydroxide, with constant stirring, so that a moist powder was produced. After drying for two hours at 120° C. in air, the powder produced was calcined at 2 h at 300° C. in air. Reduction in a stream of forming gas (95 vol. % $N_2$ and 5 vol. % $H_2$) was performed at 500° C. for a period of 2 h. The Pt-aluminum silicate powder contained, with reference to the total weight, 1.47 wt. % of platinum.

An aqueous coating dispersion with a 40% solids content was made up from the prepared Pt-aluminum silicate powder. To this were added the following zeolite powders in the ratio 1:1:1:1:1: DAY (x=200); Na-ZSM5 (x>1000); H-ZSM5 (x=120); H-ZSM5 (x =40); H-mordenite (x=20).

The precise composition of the coating dispersion is given in Table 3.

TABLE 3

Composition of the Coating

| Raw Materials | | Composition [wt. %] |
| --- | --- | --- |
| Pt-aluminum silicate | | 67 |
| H-mordenite | (x = 20) | 6.6 |
| H-ZSM5 | (x = 40) | 6.6 |
| H-ZSM5 | (x = 120) | 6.6 |
| DAY | (x = 200) | 6.6 |
| Na-ZSM5 | (x > 1000) | 6.6 |

A honeycomb-shaped, open-celled honeycomb carrier of cordierite with a 2.5 cm diameter, 7.6 cm length and 62 cells or flow channels per cm$^2$, the flow channels having a wall thickness of 0.2 mm, was used as catalyst support. This honeycomb carrier was coated with an amount of 180 g of oxides per liter of honeycomb carrier volume, by immersion in the coating dispersion. The coating was dried for 2 hours at 120° C. in air and then calcined for 2 h at 500° C. The final catalyst contained, per liter of catalyst volume, 1.77 g of platinum.

The composition of this catalyst and of all the catalysts in the following examples are listed in Table 4.

Example E2

A further catalyst in accordance with Example 1 was made up. Instead of the zeolite mixture, only the DAY-zeolite (x=200) in an amount of 33 wt. %, with reference to the total weight of catalyst mixture, was used.

Example E3

A further catalyst in accordance with Example 1 was made up. Instead of the zeolite mixture, only Na-ZSM5 (x>1000) in amount of 33 wt. %, with reference to the total weight of catalyst mixture, was used.

Example E4

A further catalyst in accordance with Example 1 was made up. Instead of the zeolite mixture, only H-ZSM5 (x=120) in amount of 33 wt. %, with reference to the total weight of catalyst mixture, was used.

Example E5

A further catalyst in accordance with Example 1 was made up. Instead of the zeolite mixture, only Na-ZSM5 (x=40) in amount of 33 wt. %, with reference to the total weight of catalyst mixture, was used.

Example E6

A further catalyst in accordance with Example 1 was made up. Instead of the zeolite mixture, only mordenite (x =20) in amount of 33 wt. %, with reference to the total weight of catalyst mixture, was used.

Example E7

A further catalyst in accordance with Example 5 was made up. Instead of an individual zeolite mixture, a zeolite mixture of H-ZSM5 (x=40) and H-ZSM5 (x=120) in the ratio 1:1 was used. The amount of zeolite was 33 wt. %, with reference to the total weight of catalyst mixture, was used.

Example E8

A further catalyst in accordance with Example 5 was made up. Instead of an individual zeolite mixture, a zeolite mixture of H-ZSM5 (x=40), H-ZSM5 (x=120) and H-ZSM5 (x>1000) in the ratio 1:1:1 was used. The amount of zeolite was 33 wt. %, with reference to the total weight of catalyst mixture, was used.

Example E9

This was another catalyst analogous to Example 1, but with a ratio by weight of Pt-aluminum silicate to zeolite mixture of 1:2. In order to arrive at the same platinum concentration in the final catalyst as in Example 1, the aluminum silicate was coated with 2.94 wt. % of platinum. The precise composition of the catalyst can be obtained from Table 4.

Example E10

Another catalyst analogous to Example 7 was made up, but with a ratio by weight of Pt-aluminum silicate to zeolite mixture of 5:1.

Examples E11–E16

Six catalysts in accordance with Example 1 with different platinum concentrations were made up. For this, Pt-aluminum silicate powders with platinum concentrations of 2.06, 1.17, 0.59, 0.29, 0.15 and 0.06 wt. % were prepared.

Example E17

A catalyst according to Example 13 with 0.18 g of Pt per liter of honeycomb carrier was also coated, along 30% of its length, with the coating dispersion for the catalyst in Example 9. The additional coating was applied at a concentration of 39 g/l of honeycomb carrier volume. The final catalyst contained 209 g of oxides per liter of honeycomb carrier and had a concentration of 0.72 g Pt/l.

Example E18

The additional coating on the catalyst in Example 15 was applied each time to 15% of the length of the honeycomb carrier starting from a front face of the honeycomb carrier.

Example E19

A catalyst was made up according to Example 10 with 1.41 g Pt/l of honeycomb carrier, but using only 60 g/dm$^3$ of aluminum silicate. A Pt-aluminum silicate with a platinum content of 2.34 wt. % (double the Pt content of Example 10) was therefore prepared for this catalyst.

Example E20

A catalyst with 140 g/l Pt-aluminum silicate and 100 g/l of zeolite mixture was made up. The platinum content of the Pt-aluminum silicate was 1.0 wt. %. The final catalyst contained 1.41 g Pt/l.

Example E21

A catalyst was prepared according to Example 10. An aqueous solution of hexachloroplatinic acid was used to activate the aluminum silicate.

Example E22

A catalyst was prepared according to Example 10. An aqueous solution of platinum (II) nitrate was used to activate the aluminum silicate.

Example E23

A catalyst was prepared according to Example 9. Palladium, incorporated using an aqueous solution of palladium(II) nitrate, was used to activate the aluminum silicate.

Example E24

A catalyst was prepared according to Example 1. A mixture of platinum and rhodium in the ratio of 5:1 was used to activate the aluminum silicate. Hexachloroplatinic acid was used as a precursor for platinum and rhodium(III) chloride was used as a precursor for rhodium.

Example E25

A catalyst according to Example 1 was prepared. A mixture of platinum, palladium and rhodium in the ratio of 10:1:3 was used to activate the aluminum silicate. Tetraamineplatinum(II) hydroxide was used as a precursor for platinum, palladium(II) nitrate as a precursor for palladium and rhodium(II) nitrate as a precursor for rhodium.

Example E26

A catalyst according to Example 10 was prepared. An aqueous solution of methylethanoloamine-platinum(II) hydroxide was used to activate the aluminum silicate.

Example E27

A catalyst according to Example 1 was prepared. Differently from Example 1, the aluminum silicate activated with platinum was not reduced in a stream of forming gas, but was only calcined in air for 2 hours at 600° C.

Example E28

A catalyst according to Example 1 was prepared, but the Pt-aluminum silicate was not dried and calcined or reduced after impregnation, but was mixed immediately with zeolite mixture and processed to form a coating dispersion. For this purpose, the aluminum silicate was dispersed in an aqueous solution of platinum (II) nitrate. Then the pH of the dispersion was increased to 9 by adding an aqueous, concentrated ammonia solution. Then the zeolite mixture was stirred into the dispersion. The final dispersion had a solids content of 40 wt. %.

Example E29

A catalyst according to Example 28 was prepared. Instead of platinum(II) nitrate, an aqueous solution of tetraammineplatinum (II) nitrate was used. Adjustment of the pH to 2 was achieved by adding a saturated aliphatic monocarboxylic acid.

Example E30

A catalyst according to Example 17 was prepared. Instead of the ceramic honeycomb carrier of cordierite, a likewise open-celled, honeycomb-shaped, metal carrier with a diameter of 2.5 cm, a length of 7.5 cm and 62 cells or flow channels per $cm^2$, the flow channels having a wall thickness of 0.4 mm, was used.

Example E31

A catalyst according to Example 9 was prepared. Instead of the aluminum silicate, a γ-aluminum oxide with a specific surface area of 188 $m^2/g$ was used.

Example E32

A catalyst according to Example 9 was prepared. Instead of the aluminum silicate, titanium oxide with a specific surface area of 95 $m^2/g$ was used.

Example E33

A catalyst according to Example 1 was made up, but with the following modifications. An aluminum silicate with a specific surface area reduced to 153 $m^2/g$ by calcination was used (see Table 1). This material was impregnated with methylethanolamine platinum(II) hydroxide in the same way as in Example 26.

The zeolite mixture selected was a mixture of DAY and Na-ZSM5. The ratio by weight of aluminum silicate to zeolites was adjusted to 6:1. The amount of coating per liter of honeycomb carrier volume was 140 g. In addition to the drying, constant temperature and reduction settings given in Example 1, the catalyst was finally reduced for 2 hours in a stream of forming gas at 500°0 C. The final catalyst contained 1.36 g of platinum per liter of catalyst volume.

Example E34

A catalyst according to Example 33 was prepared. An aqueous solution of tetraammineplatinum(II) nitrate was used to activate the aluminum silicate.

Example E35

A catalyst according to Example 34 was prepared. An aluminum silicate with 5 wt. % of silicon dioxide and a specific surface area of 212 $m^2/g$ (see Table 1) was used as support oxide.

Example E36

A catalyst according to Example 34 was prepared. An aluminum silicate with 5 wt. % of silicon dioxide and a specific surface area of 320 $m^2/g$ (see Table 1) was used as support oxide.

Example E37

A catalyst according to Example 36 was prepared. An aluminum silicate with 10 wt. % of silicon dioxide and a specific surface area of 163 $m^2/g$ (see Table 1) was used as support oxide.

TABLE 4

Composition of the Catalysts

| Example | Nobel Metal | Nobel Metal [g/dm³] | Nobel Metal plus Al₂O₃-SiO₂ [g/dm³] | Nobel Metal in Al₂O₃-SiO₂ [wt. %] | DAY x = 200 [g/dm³] | Na-ZSM5 x > 1000 [g/dm³] | H-ZSM5 x = 120 [g/dm³] | H-ZSM5 x = 40 [g/dm³] | H-mordenite x = 20 [g/dm³] | Total [g/dm³] |
|---|---|---|---|---|---|---|---|---|---|---|
| C1 | Pt | 1.77 | 0 | 0 | 0 | 0 | 0 | 0 | 96 | 120 |
| C2 | Pt | 1.77 | 0 | 0 | 0 | 0 | 0 | 0 | 0 | 165 |
| C3 | Ft | 1.77 | 0 | 0 | 0 | 0 | 0 | 0 | 0 | 200 |
| C4 | Pd | 1.77 | 120* | 1.47* | 12 | 12 | 12 | 12 | 12 | 180 |
| E1 | Pt | 1.77 | 120 | 1.47 | 12 | 12 | 12 | 12 | 12 | 180 |
| E2 | Pt | 1.77 | 120 | 1.47 | 60 | 0 | 0 | 0 | 0 | 180 |
| E3 | Pt | 1.77 | 120 | 1.47 | 0 | 60 | 0 | 0 | 0 | 180 |
| E4 | Pt | 1.77 | 120 | 1.47 | 0 | 0 | 60 | 0 | 0 | 180 |
| E5 | Pt | 1.77 | 120 | 1.47 | 0 | 0 | 0 | 60 | 0 | 180 |
| E6 | Pt | 1.77 | 120 | 1.47 | 0 | 0 | 0 | 0 | 60 | 180 |
| E7 | Pt | 1.77 | 120 | 1.47 | 0 | 0 | 30 | 30 | 0 | 180 |
| E8 | Pt | 1.77 | 120 | 1.47 | 0 | 20 | 20 | 20 | 0 | 180 |
| E9 | Pt | 1.77 | 60 | 2.94 | 24 | 24 | 24 | 24 | 24 | 180 |
| E10 | Pt | 1.77 | 150 | 1.17 | 6 | 6 | 6 | 6 | 6 | 180 |
| E11 | Pt | 2.47 | 120 | 2.06 | 12 | 12 | 12 | 12 | 12 | 180 |
| E12 | Pt | 1.41 | 120 | 1.17 | 12 | 12 | 12 | 12 | 12 | 180 |
| E13 | Pt | 0.71 | 120 | 0.59 | 12 | 12 | 12 | 12 | 12 | 180 |
| E14 | Pt | 0.35 | 120 | 0.29 | 12 | 12 | 12 | 12 | 12 | 180 |
| E15 | Pt | 0.18 | 120 | 0.15 | 12 | 12 | 12 | 12 | 12 | 180 |
| E16 | Pt | 0.07 | 120 | 0.06 | 12 | 12 | 12 | 12 | 12 | 180 |
| E17 | Pt | 1) 0.18  2) 1.78 | 1) 120  2) 26 | 1) 0.15  2) 2.06 | 1) 12  2) 2.6 | 1) 12  2) 2.6 | 1) 12  2) 2.6 | 1) 12  2) 2.6 | 1) 12  2) 2.6 | 209 |
| E18 | Pt | 1) 0.18  2) 2.47 | 1) 120  2) 26 | 1) 0.15  2) 2.06 | 1) 12  2) 2.6 | 1) 12  2) 2.6 | 1) 12  2) 2.6 | 1) 12  2) 2.6 | 1) 12  2) 2.6 | 209 |

TABLE 4-continued

Composition of the Catalysts

| Example | Nobel Metal | Nobel Metal [g/dm³] | Nobel Metal plus Al₂O₃-SiO₂ [g/dm³] | Nobel Metal in Al₂O₃-SiO₂ [wt. %] | DAY x = 200 [g/dm³] | Na-ZSM5 x > 1000 [g/dm³] | H-ZSM5 x = 120 [g/dm³] | H-ZSM5 x = 40 [g/dm³] | H-mordenite x = 20 [g/dm³] | Total [g/dm³] |
|---|---|---|---|---|---|---|---|---|---|---|
| E19 | Pt | 1.41 | 60 | 2.34 | 6 | 6 | 6 | 6 | 6 | 90 |
| E20 | Pt | 1.41 | 140 | 1.00 | 20 | 20 | 20 | 20 | 20 | 240 |
| E21 | Pt | 1.41 | 120 | 1.18 | 12 | 12 | 12 | 12 | 12 | 180 |
| E22 | Pt | 1.41 | 120 | 1.18 | 12 | 12 | 12 | 12 | 12 | 180 |
| E23 | Pd | 2.47 | 120 | 2.06 | 12 | 12 | 12 | 12 | 12 | 180 |
| E24 | Pt/Rh 5:1 | 1.77 | 120 | 1.47 | 12 | 12 | 12 | 12 | 12 | 180 |
| E25 | Pt/Rh/Pd 10:1:3 | 1.77 | 120 | 1.47 | 12 | 12 | 12 | 12 | 12 | 180 |
| E26 | Pt | 1.41 | 120 | 1.17 | 12 | 12 | | | | |
| E27 | Pt | 1.77 | 120 | 1.47 | 12 | 12 | 12 | 12 | 12 | 180 |
| E28 | Pt | 1.77 | 120 | 1.47 | 12 | 12 | 12 | 12 | 12 | 180 |
| E29 | Pt | 1.77 | 120 | 1.47 | 12 | 12 | 12 | 12 | 12 | 180 |
| E30 | Pt | 1.41 | 60 | 2.36 | 6 | 6 | 6 | 6 | 6 | 90 |
| E31 | Pt | 2.47 | 120** | 2.06** | 12 | 12 | 12 | 12 | 12 | 180 |
| E32 | Pt | 2.47 | 120*** | 2.06*** | 12 | 12 | 12 | 12 | 12 | 180 |
| E33 | Pt | 1.35 | 120 | 1.10 | 10 | 10 | 0 | 0 | 0 | 140 |
| E34 | Pt | 1.35 | 120 | 1.10 | 10 | 10 | 0 | 0 | 0 | 140 |
| E35 | Pt | 1.35 | 120 | 1.10 | 10 | 10 | 0 | 0 | 0 | 140 |
| E36 | Pt | 1.35 | 120 | 1.10 | 10 | 10 | 0 | 0 | 0 | 140 |
| E37 | Pt | 1.35 | 120 | 1.10 | 10 | 10 | 0 | 0 | 0 | 140 |

*Pd—CeO₂
**Pt-γ Al₂O₃
***Pt—TiO₂; Al₂O3-SiO₂ = aluminum silicate; dm³ = liter

Application Example

The catalytic activity of the exhaust gas purification catalysts in the preceding examples was measured in a synthesis gas unit. Using this unit, it is possible to simulate all the gaseous exhaust gas components present in the actual exhaust gas from a diesel of a gasoline engine. The test conditions selected and the model gas composition are given in Table 5. Normal- hexadence, trivial name cetane, which is known as a reference substance for determining the ignition performance of diesel fuels, was used as the hydrocarbon component. Considerable amounts of this long-chain, aliphatic compound are also found in actual diesel exhaust gas.

TABLE 5

Test Conditions and Model Gas Composition
for Determining Conversion Rates for the
Pollutants CO, HC, NO$_x$ and SO$_2$ in the Synthesis Unit

| Component | Concentration | |
|---|---|---|
| CO | 350 | [vppm] |
| H₂ | 117 | [vppm] |
| C₁₆H₃₄ | 90 | [vppm] |
| SO₂ | 25 | [vppm] |
| NO | 270 | [vppm] |
| O₂ | 6 | [vppm] |
| H₂O | 10 | [vppm] |
| CO₂ | 10.7 | [vppm] |
| N₂ | Remainder | |
| Amount of gas | 1950 | [Nl/h] |
| Size of catalyst | ø 25 mm × 76 mm | |
| Space velocity | 50000 | [h⁻¹] |
| Rate of heating | 15 | [°C./min] |

The instruments cited in Table 6 were used to measure the gaseous components present in the exhaust gas.

TABLE 6

Summary of Instruments Used for Measuring the
Exhaust Gas concentration on the Synthesis Gas Test Stand

| Gas Analyzed For | Instrument | Manufacturer |
|---|---|---|
| O₂ | Oxmat | Siemens AG |
| Hydrocarbon | FID | Pierburg Messteechnik |
| NO$_x$ | CLD 700 Elht | Zellweger ECO-Systeme |
| CO | Binos | Rosemount |
| CO₂ | Binos | Rosemount |
| SO₂ | Binos | Rosemount |

The conversions of carbon monoxide and hydrocarbons were measured on the synthesis gas unit under continuous operation at exhaust gas temperatures of 140° C. The measurements were performed with both freshly prepared and also aged catalysts (oven aging: 16 h at 750° C. in air +10 vol. % H₂O+25 ppm SO₂)

To determine the light-off temperatures, the exhaust gas was heated at a rate of 15° C./min. The conversion of nitrogen oxides was determined at an exhaust gas temperature of 200° C.

Calculation of the conversion rates was performed using the following formula:

$$X = \frac{N_E - N_A}{N_E} \cdot 100\%$$

X=Conversion rate [%]

$N_E$=Concentration of pollutant entering the catalyst [vppm]

$N_A$=Concentration of pollutant leaving the catalyst [vppm]

The pollutant conversions produced with the catalysts from the comparison examples and Examples E1 (to E37) are given in Tables 7 and 8. Table 7 gives the performance data for freshly prepared catalysts, whereas the results in Table 8 were obtained with catalysts which had been subjected to oven aging for 16 h at 750° C. in air +10% vol. % $H_2O$+25 ppm $SO_2$.

Further variations and modifications of the foregoing will be apparent to those skilled in the art from the foregoing and are intended to be encompassed by the claims appended hereto.

German priority application 196 14 540.6 is relied on and incorporated herein by reference.

TABLE 7

Pollutant Conversion by Catalysts from Examples E1 to E37 and C1 to C4 in the Freshly Prepared State

| Example | $T_{50\%}$ [° C.] CO | $T_{50\%}$ [° C.] HC | Conversion at 140° C. [%] CO | Conversion at 140° C. [%] HC | Conversion at 200° C. [%] NOx |
|---|---|---|---|---|---|
| C1 | 145 | 155 | 35 | 26 | 11 |
| C2 | 160 | 175 | 17 | 10 | 1 |
| C3 | 150 | 160 | 29 | 25 | 9 |
| C4 | 202 | <75 | 5 | 78 | 5 |
| E1 | 138 | <75 | 55 | 83 | 59 |
| E2 | 148 | <75 | 46 | 77 | 40 |
| E3 | 147 | <75 | 52 | 75 | 46 |
| E4 | 148 | <75 | 45 | 75 | 40 |
| E5 | 146 | <75 | 47 | 75 | 45 |
| E6 | 145 | <75 | 50 | 76 | 44 |
| E7 | 144 | <75 | 47 | 80 | 42 |
| E8 | 140 | <75 | 50 | 83 | 48 |
| E9 | 139 | <75 | 53 | 87 | 58 |
| E10 | 140 | <75 | 50 | 78 | 59 |
| E11 | 135 | <75 | 55 | 83 | 70 |
| E12 | 142 | <75 | 45 | 85 | 61 |
| E13 | 155 | <75 | 22 | 85 | 50 |
| E14 | 160 | <75 | 15 | 80 | 48 |
| E15 | 171 | <75 | 5 | 74 | 48 |
| E16 | 185 | <75 | 5 | 76 | 40 |
| E17 | 147 | <75 | 46 | 78 | 48 |
| E18 | 144 | <75 | 47 | 78 | 55 |
| E19 | 141 | <75 | 49 | 83 | 59 |
| E20 | 139 | <75 | 51 | 79 | 61 |
| E21 | 141 | <75 | 47 | 80 | 55 |
| E22 | 183 | <75 | 10 | 78 | 12 |
| E23 | 175 | <75 | 25 | 85 | 18 |
| E24 | 145 | <75 | 45 | 83 | 51 |
| E25 | 149 | <75 | 45 | 79 | 45 |
| E26 | 144 | <75 | 47 | 86 | 59 |
| E27 | 141 | <75 | 70 | 81 | 75 |
| E28 | 141 | <75 | 69 | 80 | 73 |
| E29 | 137 | <75 | 69 | 80 | 73 |
| E30 | 141 | <75 | 59 | 82 | 70 |
| E31 | 137 | <75 | 49 | 78 | 55 |
| E32 | 139 | <75 | 51 | 81 | 59 |
| E33 | 133 | <75 | 98 | 80 | 40 |
| E34 | 137 | <75 | 90 | 80 | 38 |
| E35 | 138 | <75 | 83 | 79 | 41 |
| E36 | 141 | <75 | 65 | 78 | 37 |
| E37 | 135 | <75 | 94 | 81 | 37 |

TABLE 8

Pollutant Conversion by Catalysts from Selected Examples after Oven Aging
(16 h, 750° C., Air + 10 vol. % $H_2O$ = 25 ppm $SO_2$)

| Example | $T_{50\%}$ [° C.] CO | $T_{50\%}$ [° C.] HC | Conversion at 140° C. [%] CO | Conversion at 140° C. [%] HC | Conversion at 200° C. [%] NOx |
|---|---|---|---|---|---|
| C1 | 199 | 215 | 9 | 3 | 1 |
| C2 | 209 | 235 | 5 | 2 | 0 |
| C3 | 190 | 199 | 8 | 8 | 5 |
| C3 | 222 | <75 | 1 | 76 | 1 |
| E1 | 175 | <75 | 18 | 75 | 53 |
| E2 | 180 | <75 | 13 | 7 | 8 |
| E3 | 188 | <75 | 12 | 70 | 29 |
| E4 | 187 | <75 | 11 | 71 | 26 |
| E5 | 186 | <75 | 13 | 69 | 31 |
| E6 | 186 | <75 | 12 | 71 | 30 |
| E7 | 180 | <75 | 14 | 70 | 31 |
| E8 | 177 | <75 | 16 | 75 | 40 |
| E32 | 185 | <75 | 11 | 74 | 41 |
| E33 | 174 | <75 | 21 | 76 | 35 |

We claim:

1. A catalyst composition for purifying the exhaust gases from diesel engines comprising a mixture of zeolites with up to five zeolites with different moduli, at least one platinum group metal, and
   at least one metal oxide selected from the group consisting of aluminum silicate, aluminum oxide and titanium oxide, wherein the aluminum silicate has a ratio by weight of silicon dioxide to aluminum oxide of 0.005 to 1 and said platinum group metal is deposited on only said metal oxide.

2. The catalyst composition according to claim 1, wherein said zeolite mixture contains at least two zeolites with moduli greater than 10, one of which has a modulus less than 50 and the other has a modulus greater than 200.

3. The catalyst composition according to claim 2, wherein the ratio by weight of said metal oxide and the platinum group metal to zeolite mixture is 10:1 to 1:3.

4. The catalyst composition according to claim 3, wherein said ratio of said metal oxide and said platinum group metal to zeolite mixture is 6:1 to 2:1.

5. The catalyst composition according to claim 1 wherein the metal oxide is aluminum silicate and the platinum group metal is platinum and said zeolite mixture is a mixture of a dealuminized Y-zeolite and a Na-ZSM5 zeolite with moduli greater than 120, wherein the aluminum silicate has a specific surface area between 100 to 200 $m^2/g$, which is coated with 0.05 to 0.2 mg $Pt/m^2$.

6. The catalyst composition according to claim 5, wherein the ratio by weight of said aluminum silicate to zeolite mixture is in the range 6:1 to 2:1.

7. A honeycomb carrier having applied thereto a coating formed from the catalyst composition according to claim 1.

8. The method for purifying exhaust gas from a diesel engine comprising passing said exhaust gas in contact with a honeycomb carrier having applied thereto a coating formed from the catalyst composition of claim 1.

9. The honeycomb carrier according to claim 7 wherein said coating is applied at a concentration of 50 to 400 g/l of the honeycomb carrier.

10. The honeycomb carrier according to claim 7, wherein the platinum group metal is present at a concentration of 0.01 to 5 g/l of the honeycomb carrier.

11. A honeycomb carrier having applied thereto a coating formed from the catalyst composition according to claim 2.

12. A honeycomb carrier having applied thereto a coating formed from the catalyst composition according to claim 3.

13. A honeycomb carrier having applied thereto a coating formed from the catalyst composition according to claim 4.

14. A honeycomb carrier having applied thereto a coating formed from the catalyst composition according to claim 5.

15. A catalyst composition for purifying the exhaust gases from diesel engines consisting essentially of a mixture of zeolites with up to five zeolites with different moduli, at least one platinum group metal, and at least one metal oxide selected from the group comprising of aluminum silicate, aluminum oxide and titanium oxide, wherein the aluminum silicate has a ratio by weight of silicon dioxide to aluminum oxide of 0.005 to 1 and said platinum group metals are deposited on only said metal oxide.

16. A honeycomb carrier having applied thereto a coating formed from the catalyst composition according to claim 15.

* * * * *